United States Patent

Newton et al.

[11] Patent Number: 5,268,942
[45] Date of Patent: Dec. 7, 1993

[54] TEMPORARY COOLING SYSTEM AND METHOD FOR REMOVING DECAY HEAT FROM A NUCLEAR REACTOR

[75] Inventors: Peter M. Newton, Richland; John B. Mason, Pasco, both of Wash.; Steven K. Hamilton, Columbia, S.C.

[73] Assignee: Pacific Nuclear Systems, Inc., Richland, Wash.

[21] Appl. No.: 943,044

[22] Filed: Sep. 10, 1992

[51] Int. Cl.$^5$ ............................................. G21C 19/00
[52] U.S. Cl. ................................... 376/272; 376/298; 376/299
[58] Field of Search ................. 376/298, 299, 268, 272

[56] References Cited

U.S. PATENT DOCUMENTS

| | | | |
|---|---|---|---|
| 4,033,814 | 7/1977 | Bregeon et al. | 376/272 |
| 4,318,492 | 3/1982 | Peehs et al. | 220/228 |
| 4,367,194 | 1/1983 | Schenewerk et al. | 376/272 |
| 4,534,931 | 8/1985 | Schneider | 376/272 |

OTHER PUBLICATIONS

Dec. 8, 1992, Declaration of Peter Malcolm Newton.

Primary Examiner—Donald P. Walsh
Assistant Examiner—Frederick H. Voss
Attorney, Agent, or Firm—Robert C. Tucker; William David Kiesel

[57] ABSTRACT

In combination with a nuclear power generating facility including a composite fuel pool including a reactor cavity and a spent fuel pool fluidly connectable to the reactor cavity, the composite fuel pool at least partially containing a primary fluid, a nuclear reactor vessel positioned in the reactor cavity, a residual heat removal system installed in the facility and fluidly connectable to the reactor vessel, and a spent fuel pool cooling system installed in the facility and fluidly connectable to the spent fuel pool, a temporary cooling system is provided, comprising a primary heat exchange system including a primary heat exchanger for transferring heat from a primary fluid to a secondary cooling fluid. The primary heat exchanger is temporarily locatable in the facility, and is temporarily fluidly connected to the composite fuel pool. A primary pump, also temporarily locatable in the facility, circulates primary fluid through the primary heat exchanger, which cools the primary fluid to a desired point at a faster rate than the spent fuel pool cooling system, allowing fuel to be immediately removed from the reactor rather than waiting for the residual heat removal system to cool the primary fluid to a point at which the spent fuel pool cooling system is able to provide adequate cooling capacity. Particulate filtration and demineralization may also be furnished with the system and method of the invention.

24 Claims, 5 Drawing Sheets

TEMPORARY COOLING SYSTEM AND METHOD FOR REMOVING DECAY HEAT FROM A NUCLEAR REACTOR

BACKGROUND OF THE INVENTION

1. Field of the Invention

This invention relates generally to cooling systems used to cool water in the nuclear reactor of nuclear power generating facilities and, more particularly, to temporary cooling systems which supplement existing cooling systems in such facilities.

2. Prior Art

In nuclear power generating facilities, nuclear fuel and water are contained in a reactor vessel positioned in what is commonly called a refueling cavity or a reactor cavity. During power generation, a primary fluid, normally water, is heated by the nuclear fuel, providing steam for electric power generation. During shutdowns for refueling and other periods when the reactor is not operating, decay heat from the fuel continues to heat the water in the reactor vessel. The water must be cooled to a desired level before fuel may be removed from the vessel and transferred to the spent fuel pool (SFP) of the facility via the reactor cavity. The reactor core is cooled of residual decay heat during shutdown by a permanently installed residual heat removal (RHR) system. It provides heat exchange cooling for decay heat coming from the fuel in the reactor core during shutdown. The heat removal capacity of this system is necessarily large. During normal shutdown, the RHR system is operated for a number of days in order to remove decay heat from the fuel to a point where it may be removed from the core. This is due to the fact that the SFP, the eventual storage place for the fuel, has a permanently installed cooling system, the SFP Cooling System, which does not have sufficient cooling capacity to remove the high level of residual heat immediately following plant shutdown.

Thus, in situations requiring removal of the fuel from the reactor core, the permanent cooling system configuration in present-day nuclear plants requires that the RHR system be operated for a period of days in order to cool the fuel such that it may then be removed to the SFP, then allowing reactor servicing, such as fuel replacement or the decontamination of components such as the reactor recirc system (RRS). The current practice prior to the instant invention was simply to wait until cooling by the RHR system was complete and then proceed to remove the fuel. This increased the facility shutdown period by the number of days required for such cooling, thus increasing the cost of the shutdown operation, lost revenues, as well as the cost of replacement power purchased during the shutdown. The cost of replacement power alone is currently measured in hundreds of thousands of dollars per day. However, permanently increasing the capacity of the SFP cooling system is inordinately expensive and impractical. It is therefore the accepted practice to continue with lengthy prior art cooling methods using the existing systems.

SUMMARY OF THE INVENTION

Considering the prior art problems discussed above, it is an object of this invention to provide a temporary cooling system and method for removing decay heat from a nuclear reactor which allow a temporary connection to be made to either the spent fuel pool or the reactor cavity of a nuclear reactor for supplemental cooling of the primary fluid within the SFP and/or the reactor, accomplished with temporarily placed cooling equipment.

It is another object of this invention to provide a temporary cooling system and method for removing decay heat from a nuclear reactor wherein the primary fluid is both cooled and filtered for particulate matter.

It is yet another object of this invention to provide a temporary cooling system and method for removing decay heat from a nuclear reactor wherein the primary fluid is both cooled and demineralized.

Accordingly, in combination with a nuclear power generating facility including a composite fuel pool including a reactor cavity and a spent fuel pool fluidly connectable to the reactor cavity, the composite fuel pool at least partially containing a primary fluid, a nuclear reactor vessel positioned in the reactor cavity, a residual heat removal system installed in the facility and fluidly connectable to the reactor vessel, and a spent fuel pool cooling system installed in the facility and fluidly connectable to the spent fuel pool, a temporary cooling system is provided, comprising a primary heat exchange system including a primary heat exchanger for transferring heat from a primary fluid to a secondary cooling fluid. The primary heat exchanger is temporarily locatable in the facility, and is temporarily fluidly connected to the composite fuel pool. A primary pump, also temporarily locatable in the facility, circulates primary fluid through the primary heat exchanger, which cools the primary fluid to a desired point at a faster rate than the spent fuel pool cooling system, allowing fuel to be immediately removed from the reactor rather than waiting for the residual heat removal system to cool the primary fluid to a point at which the spent fuel pool cooling system is able to provide adequate cooling capacity. Particulate filtration and demineralization may also be furnished with the system and method of the invention.

DETAILED DESCRIPTION OF PREFERRED EMBODIMENTS OF THE INVENTION

Figure 1:
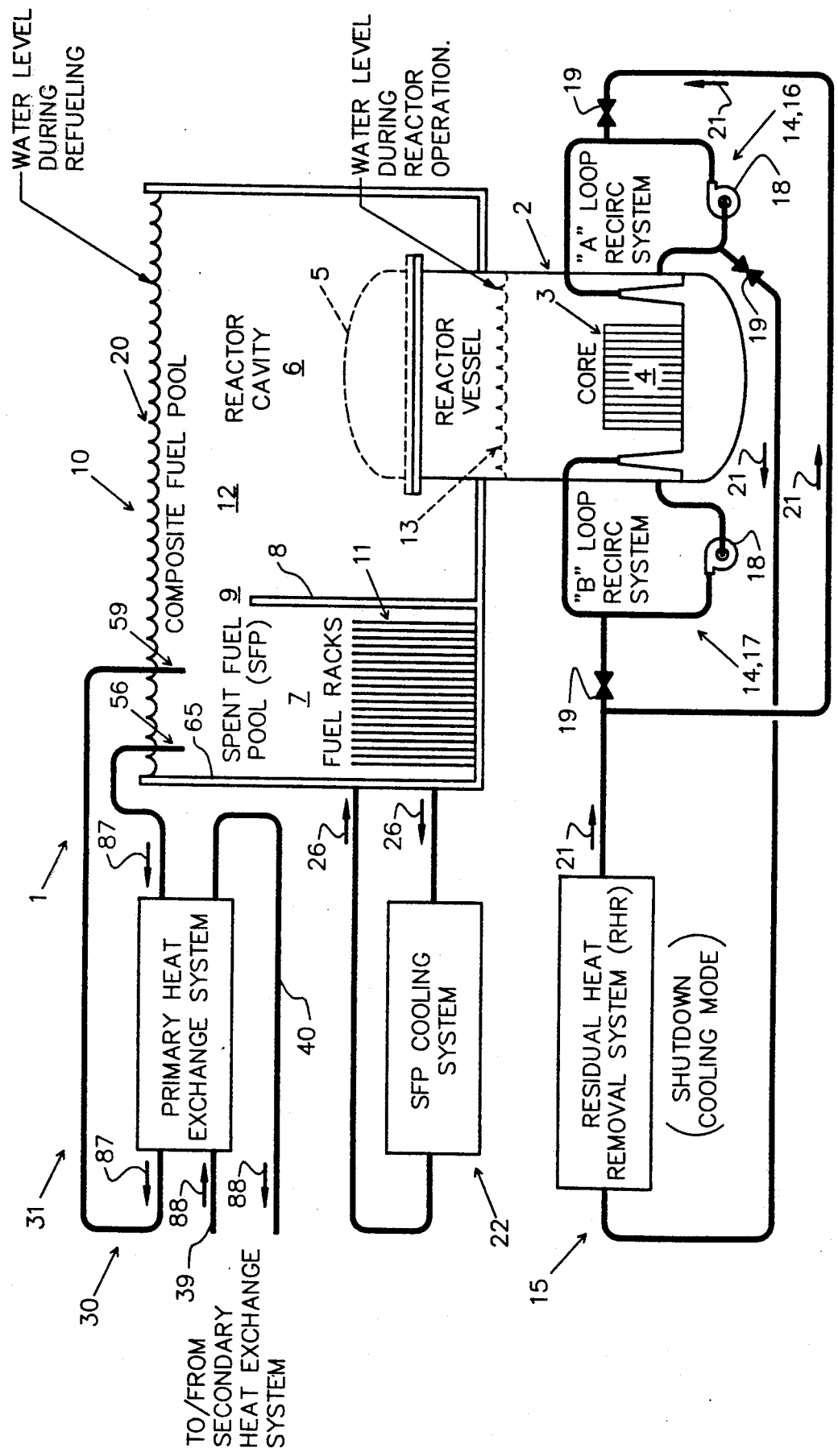
FIG. 1 is a schematic depiction of the layout of the relevant components of a typical nuclear power generating facility having an embodiment of the invention connected thereto.

As shown in FIG. 1, in a typical nuclear power generating facility 1 (only the pertinent parts are shown), a reactor building 23 contains a reactor vessel 2, which contains a core 3, which comprises numerous elements of nuclear fuel 4, usually in the form of fuel bundles. During power generating operations reactor vessel 2 is closed using top 5. Reactor vessel 2 is positioned within a reactor cavity 6, which is fluidly connected to a spent fuel pool (SFP) 7 during outages. In the facility embodiment shown, the SFP 7 is separated from the reactor cavity by a wall 8, having a closeable opening 9, closeable by a gate (not shown) or other means known in the art so as to isolate the SFP 7 from the reactor cavity 6. Since various embodiments of facilities 1 are possible, the SFP 7 and reactor cavity 6 will be jointly referred to as the "composite fuel pool" 10, which will refer to any point within either the SFP 7 or the reactor cavity 6. An example of an alternate embodiment of the composite fuel pool 10 is one wherein the SFP 7 and reactor cavity 6 are separated by a conduit (not shown) rather than a wall 8. The SFP 7 typically contains fuel racks 11, which support spent fuel bundles which are stored in the SFP 7.

During power generating operations, top 5 is closed and primary fluid 12 (normally water) is contained within reactor vessel 2 at an operating level 13 above core 3. The core 3 heats primary fluid 12, generating steam which is used to generate electric power. The extensive piping and additional apparatus used for generating power is not relevant to the instant invention and is thus not shown. The reactor recirc system (RRS) 14 recirculates water within the reactor vessel 2, and is fluidly connected to the residual heat removal (RHR) system 15 during shutdown periods. In the facility embodiment shown in FIG. 1, the RRS 14 includes an "A" loop 16 and a "B" loop 17. Circulation is maintained by recirc pumps 18. Valves 19 provide isolation of the RRS 14 from the RHR system 15. Of course, many different configurations of piping and valves are possible, and vary from facility to facility.

The facility 1 may be shut down for various reasons, including total or partial fuel replacement, decontamination of components, or for other reasons. Detailed shutdown procedures are required in order to maintain system safety. In order to remove fuel bundles 4 from the core 3, top 5 is removed and the level of primary fluid 12 is raised to a refueling level 20 within the composite fuel pool 10. Following this step the closeable opening 9 is in an open position, allowing primary fluid 12 to equalize refueling level 20 within both the SFP 7 and reactor cavity 6. Once refueling level 20 is stable, the fuel bundles 4 may be lifted from the core 3 and placed in fuel racks 11. However, the initial decay heat from the fuel bundles 4 must be removed during this procedure.

Once the core 3 is shut down, decay heat continues to be generated by the fuel 4. The RHR system 15 is designed to provide heat exchange to cool the primary fluid 12, removing the tremendous initial decay heat generated upon system shutdown. As shown by flow arrows 21, the RHR system 15 cools primary fluid 12 and recirculates the cooled primary fluid 12 back to the reactor vessel 2. As stated above, the prior art method of cooling the primary fluid 12 requires operation of the RHR system 15 for a number of days until the initially large amount of decay heat is removed from the primary fluid 12. The amount of heat removed during RHR system operation can be on the order of 50,000,000 BTU/hr. The RHR system 15 was operated until the fuel bundles 4 were cooled to a point where they could be removed to the SFP 7, where the smaller capacity SFP cooling system 22 would continue to circulate primary fluid from the SFP 7 (see flow arrows 26) and remove the decay heat at a much smaller rate, for example 1,000,000 BTU/hr. The RHR system 15 and SFP cooling system 22 are permanently installed in the facility 1. Due to the permanent nature of the installation, as well as safety, redundancy, licensing and contamination problems, modification of the permanent cooling systems would be impractical and overly expensive.

Figure 2:
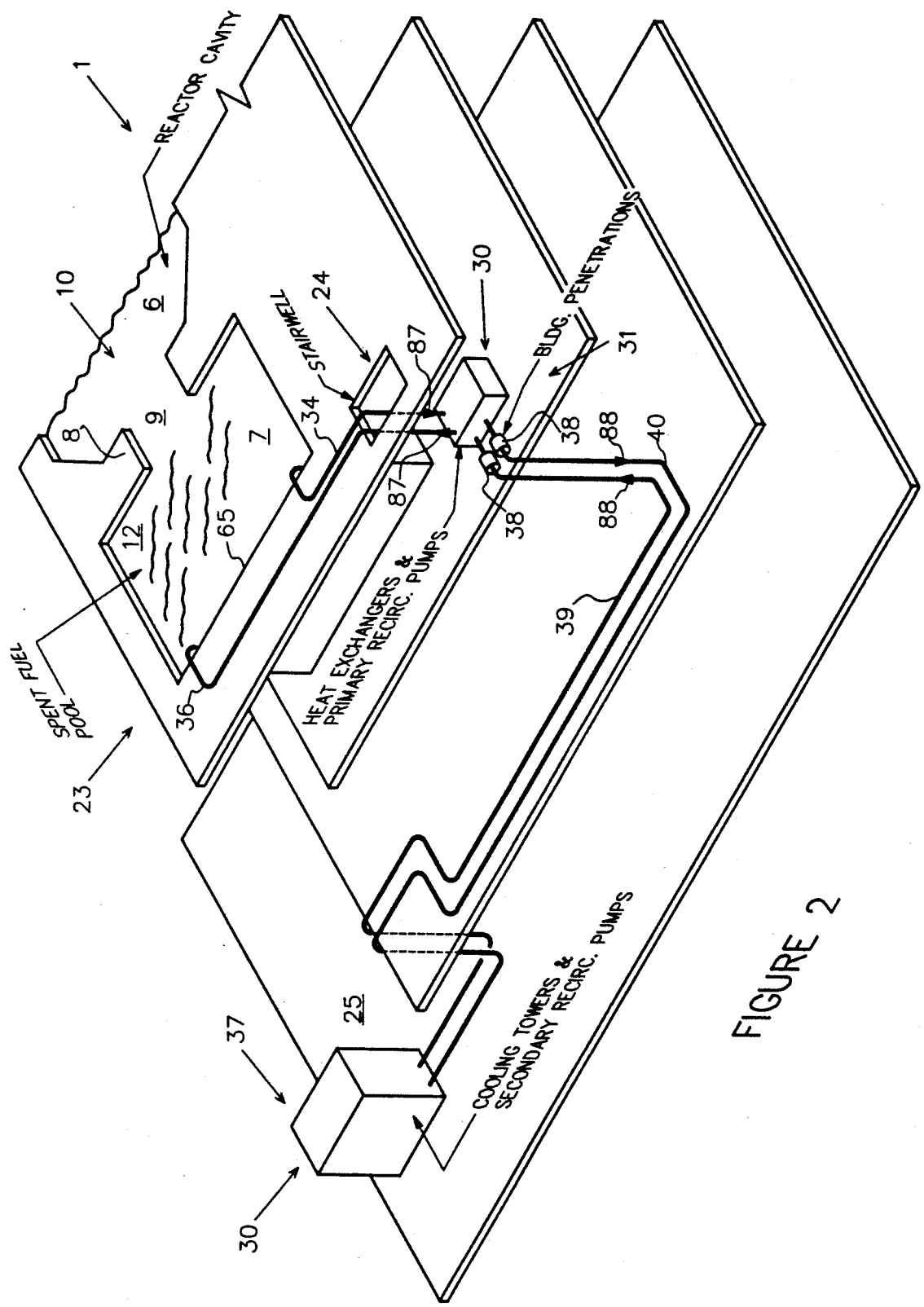
FIG. 2 is a perspective schematic illustrating the location of an embodiment of the invention within a nuclear power generating facility.

The temporary cooling system 30 provides immediate increased cooling capacity with no additional permanent connections to the facility 1. The invention 30 comprises a primary heat exchange system 31, which includes a primary heat exchange means 32 for transferring heat from primary fluid 12 to a secondary cooling fluid, a primary pump 33, a primary pump suction line 34, a primary pump discharge line 35 and a primary return line 36. Primary fluid 12 is circulated in primary heat exchange system 31, where heat is transferred to a secondary cooling fluid from a secondary heat exchange system 37. All heat exchange equipment, pumps and other components of the invention 30 may be mounted on skids 55 (see FIG. 3) and temporarily located within the facility 1. Due to severe space limitations within facilities 1, components of the invention 30 may be located in various places within a facility 1, as shown in FIG. 2. Due to radioactive particles circulating in the primary heat exchange system 31, it is preferable to locate the primary heat exchange system 31 within the containment of building 23. FIG. 2 shows a building 23 schematically (with walls removed for clarity), with the primary heat exchange system 31 located within the building 23 near a stairwell 24. Stairwell 24 provides an opening for primary pump suction line 34 and primary return line 36. Secondary heat exchange system 37 may be positioned at a point on the exterior of the building 23, such as a roof area 25. In this case, building penetrations 38 will need to be provided for secondary cooling fluid supply line 39 and secondary cooling fluid return line 40. Alternately, secondary heat exchange system 37 may also be positioned at a point on the interior of the building 23.

Figure 3:
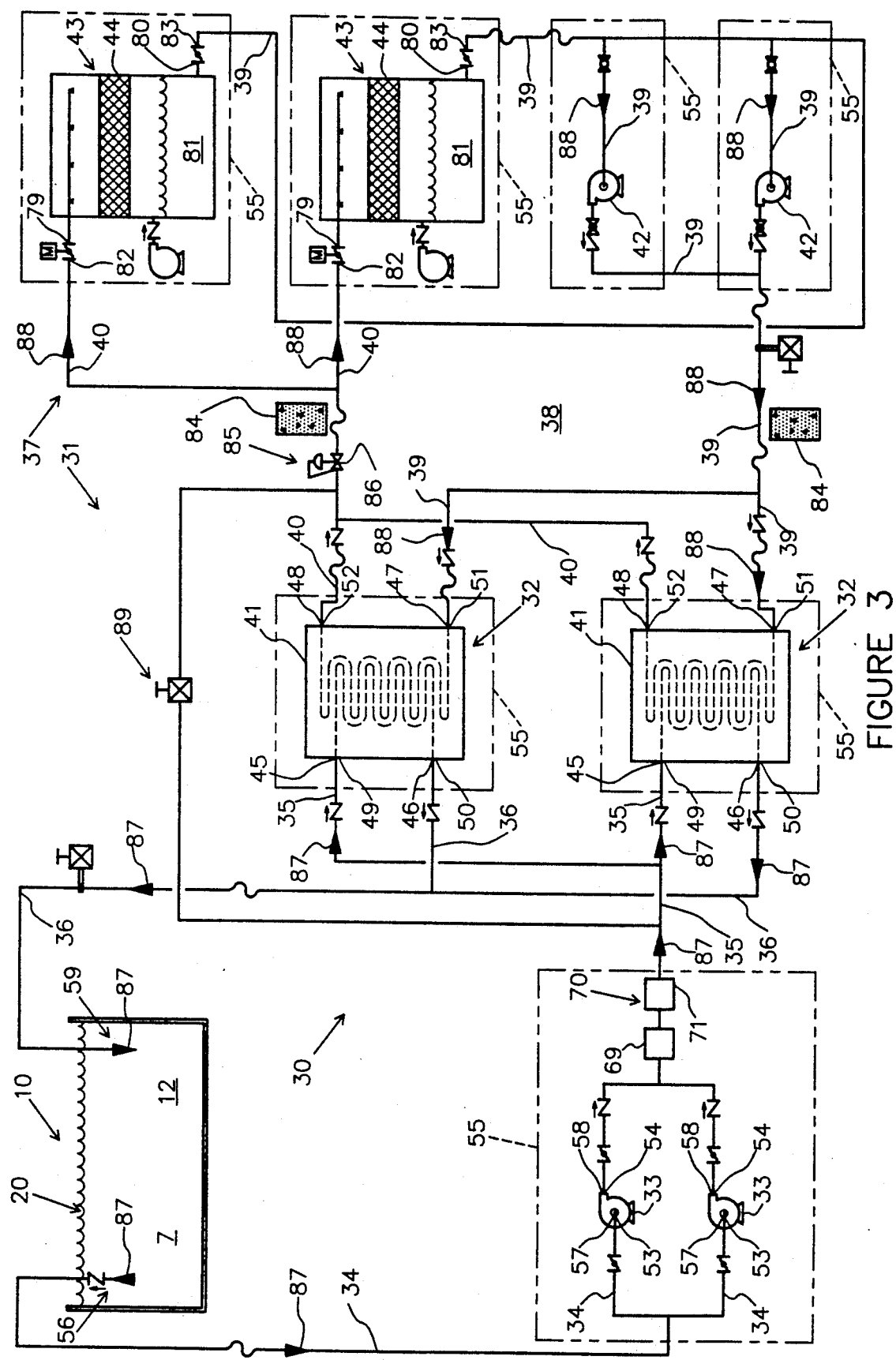
FIG. 3 is a schematic illustration of an embodiment of the invention.

A more detailed schematic of a preferred embodiment of the invention 30 is shown in FIG. 3. As can be seen, the system 30 is provided with some redundancy in order to assure adequate heat exchange capacity. Thus, two primary pumps 33, two primary heat exchangers 41, two secondary pumps 42 and two secondary heat exchange means 43 are provided. One or both of each of these components (if properly sized for the desired heat transfer rate) will adequately function in the system 30. The primary heat exchange means 32 preferably comprises a primary heat exchanger 41. It has been found that a plate-type heat exchanger (such as a Graham Manufacturing Company, Inc. Model No. UFX-51 plate heat exchanger) works well for this application, although other heat exchange means known in the art, such as chillers, may be used. Primary heat exchangers 41 each have a primary inlet 45, a primary outlet 46, a secondary inlet 47 and a secondary outlet 48. Primary inlets 45 are fluidly connected to outlet ends 49 of primary pump discharge line 35, and primary outlets 46 are fluidly connected to inlet ends 50 of primary return line 36. Secondary inlets 47 are fluidly connected to outlet ends 51 of secondary cooling fluid supply line 39, and secondary outlets 48 are fluidly connected to inlet ends 52 of secondary cooling fluid return line 40. For the purposes of this disclosure, the terms "fluidly connected" or "fluidly connectable" refer to the ability for fluid to flow from one element to another element. There may be numerous components, such as piping, valves, pumps, measuring devices, etc. interposed between such elements, which are not necessarily claimed as part of the invention 30 and which are simply part of the fluid connection or potential fluid connection.

Primary pumps 33 each have an inlet 53 and an outlet 54. Primary pump suction line 34 has an inlet end 56 removably and fluidly connected to composite fuel pool 10. Both primary pump suction line 34 and primary return line 36 are shown connected to the SFP 7, but may also be connected anywhere in the composite fuel pool 10, depending upon the desired flow dynamics for the particular facility 1 in which the invention 30 is installed. For example primary pump suction line 34 could be connected to the reactor cavity 6 and primary return line 36 could be connected to the SFP 7. Outlet ends 57 of primary pump suction line 34 are fluidly connected to primary pump inlets 53. Inlet ends 58 of primary pump discharge line 35 are fluidly connected to primary pump outlets 54. Thus, primary pumps 33 draw primary fluid 12 from composite fuel pool 10, circulate it through primary heat exchanger 41 and return it through outlet end 59 of primary return line 36, which is removably and fluidly connected to composite fuel pool 10.

Figure 6:
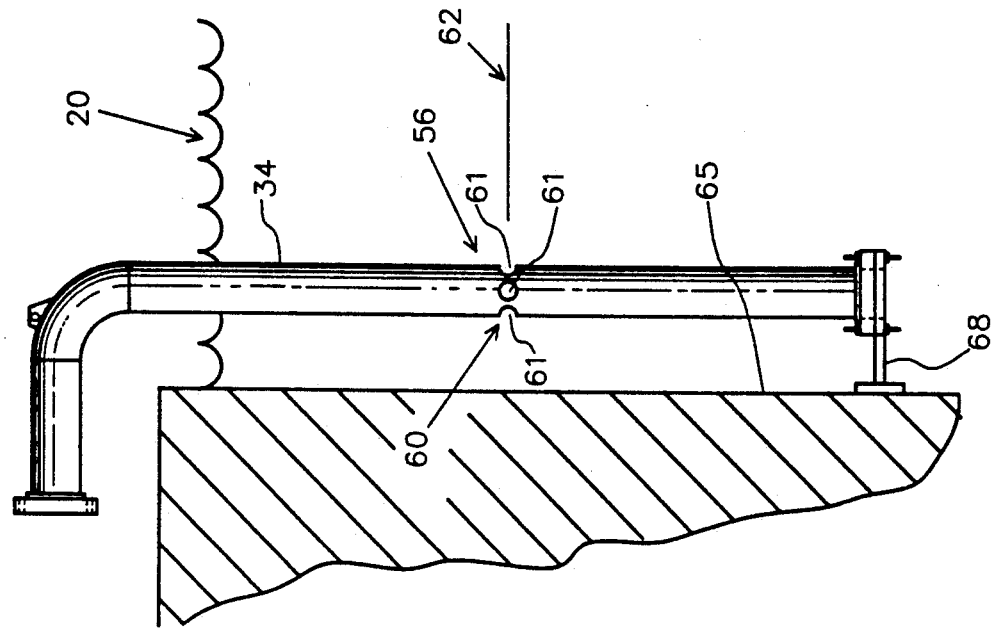
FIG. 6 is a side view of an embodiment of the anti-siphon means of the invention.
Figure 5:
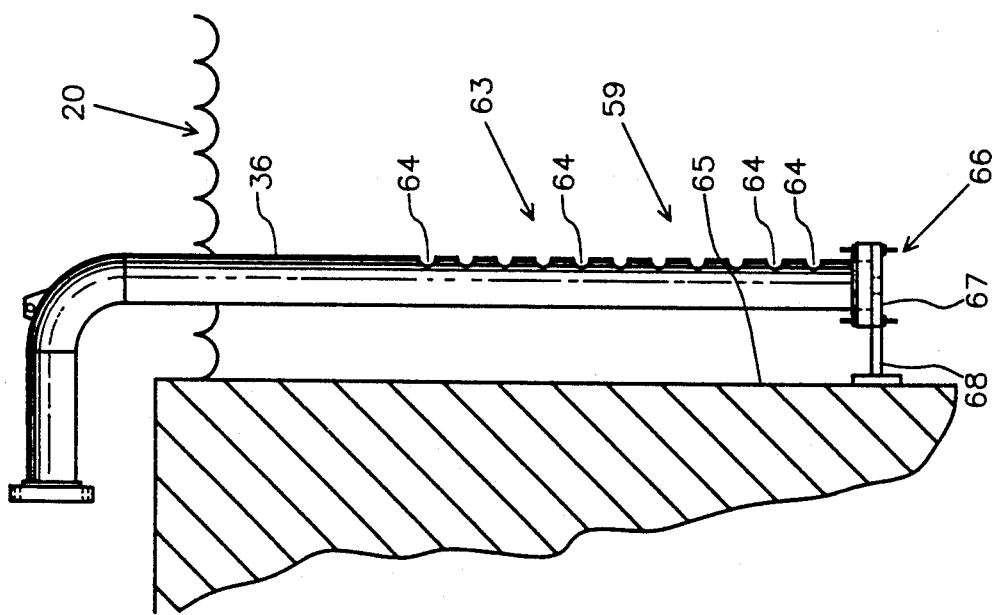
FIG. 5 is a side view of an embodiment of the flow distribution means of the invention.

The invention 30 may include an anti-siphon means 60 for preventing siphoning of primary fluid 12 from composite fuel pool 10 when primary fluid 12 falls below an undesirable level 62. Anti-siphon means 60 is connected to a portion of primary pump suction line 34 which is submersible in composite fuel pool 10, as shown in FIG. 6. Anti-siphon means 60 may take the form of one or more anti-siphon holes 61 in primary pump suction line 34, as shown in FIG. 6. It is also desirable to reduce turbulence from primary fluid 12 reentering composite fuel pool 10 through primary return line 36. This may be accomplished by providing a flow distribution means 63, connected to a portion of primary return line 36 which is submersible in composite fuel pool 10, for distributing return flow of primary fluid 12 to composite fuel pool 10. Flow distribution means 63 may comprise a plurality of flow distribution holes 64 provided in primary return line 36, as shown in FIG. 5. It has been found that one or more vertical rows of holes 64, facing away from wall 65 of composite fuel pool 10 will function adequately. Force from the exiting primary fluid 12 will maintain pipe support 68 in an abutted position against wall 65 for added stability. Of course flow through the end opening 66 of primary return line 36 should be restricted by an orifice plate 67 or other means known in the art in order to force return flow through flow distribution holes 64. The orifice in orifice plate 67 should be approximately the same size as holes 64.

Primary fluid 12 normally contains particulate matter which accumulates in the core 3, composite fuel pool 10 and system piping. Since the particulate matter is exposed to the fuel 4, it becomes radioactive and will contaminate primary heat exchange means 32. Therefore, it is preferable that one or more particulate filters 69 be fluidly connected between composite fuel pool 10 and primary heat exchange means 32 (either in primary pump suction line 34 or primary pump discharge line 35). As shown in FIG. 3, it is preferable that particulate filters 69 be located in primary pump discharge line 35 between primary pumps 33 and primary heat exchange means 32. Particulate filters 69 may take any form known in the art, and preferably comprise remotely or semi-remotely removable filter cartridges, such as Filterite pleated polyethylene or cloth wound filter cartridges. An additional advantage to utilizing particulate filters 69 is the simultaneous filtering and resulting decontamination of SFP 7 and/or reactor cavity 6 during operation of the temporary cooling system 30, saving further time and resulting facility outage normally associated with separate and independent filtration operations.

Figure 4:
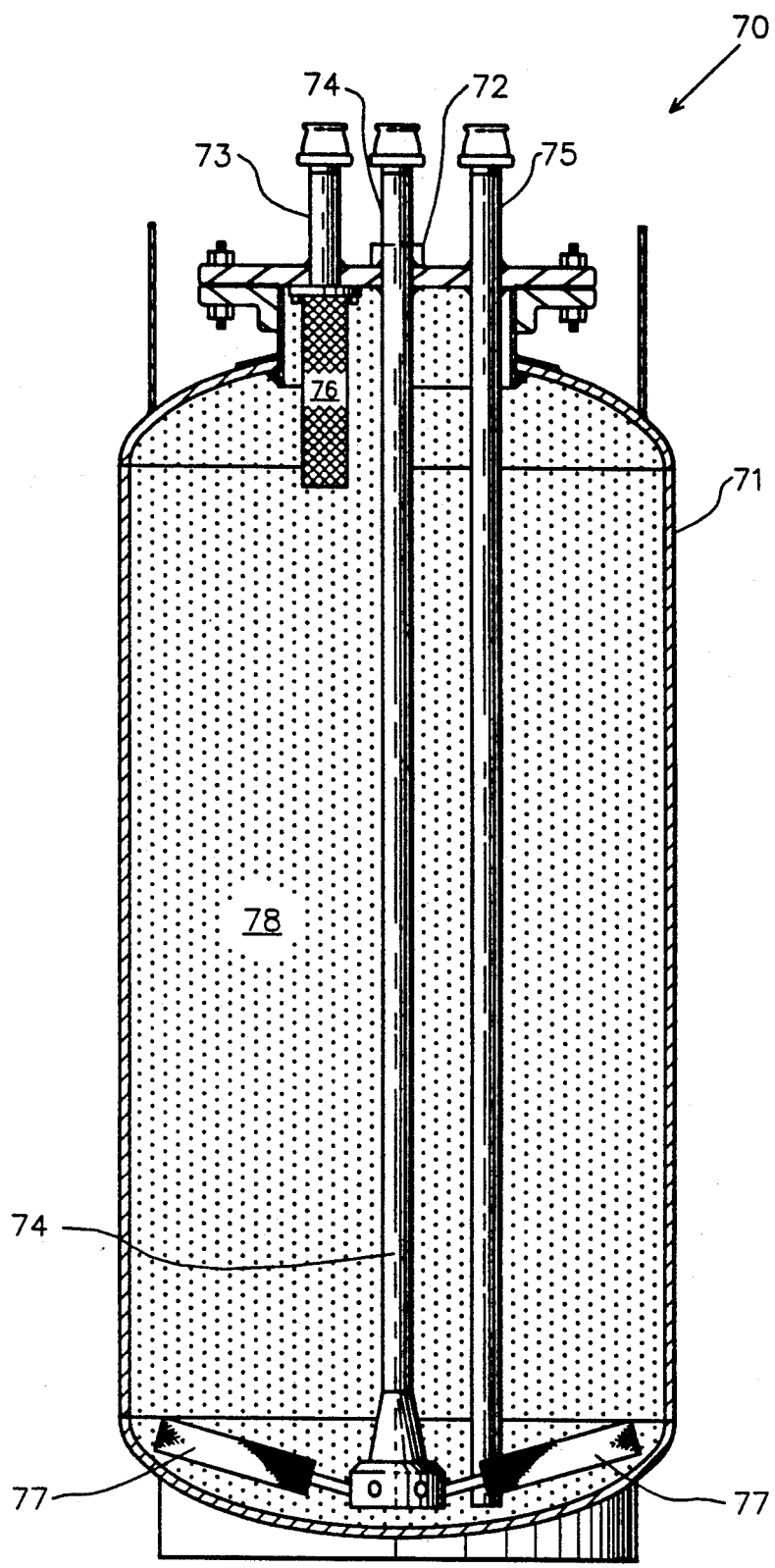
FIG. 4 is a sectional view of a typical demineralization means in the form of an ion exchange vessel, which may be used in an embodiment of the invention.

Similarly, it may also be preferable to conduct simultaneous cooling, filtration and demineralization of primary fluid 12. A demineralization means 70 is thus provided for removing undesirable minerals from primary fluid 12. Demineralization means 70 is fluidly connected between composite fuel pool 10 and primary heat exchange means 32 (either in primary pump suction line 34 or primary pump discharge line 35), preferably between particulate filters 69 and primary heat exchange means 32, as shown in FIG. 3. Demineralization means 70 may take any form known in the art, such as the ion exchange vessel 71 shown in FIG. 4. The vessel 71 is provided with a resin fill inlet 72, a process inlet pipe 73, a process outlet pipe 74, a sluice outlet pipe 75, inlet screen 76 and outlet screens 77. The vessel 71 is filled with ion exchange resin 78, such as Purolite ion exchange bead resin. Inlet pipe 73 and outlet pipe 74 are fluidly connected to the temporary cooling system 30 such that primary fluid 12 flows through inlet pipe 73 and inlet screen 76, then downward through resin 78 where it is demineralized, then out through outlet screens 77 and outlet pipe 74 and back to the temporary cooling system 30. Sluice outlet pipe 75 is used to remove spent resin 78.

Any source of secondary cooling fluid 81 (such as water or freon) may be supplied to primary heat exchange means 32. As shown in FIG. 3, such a source may comprise a secondary heat exchange system 37. Secondary heat exchange system 37 includes secondary heat exchange means 43 for cooling secondary cooling fluid 81, which may comprise any suitable secondary heat exchangers 44, such as cooling towers. It was found that Baltimore Aircoil Company Series V cooling towers, Model VT1-N346-Q worked well in a test application. Circulation in secondary heat exchange system may be provided by secondary pumps 42, or other means, such as gravity. Secondary heat exchangers 44 are provided with secondary cooling fluid inlets 79, fluidly connected to outlet ends 82 of secondary cooling fluid return line 40, and secondary cooling fluid outlets 80, fluidly connected to inlet ends 83 of secondary cooling fluid supply line 39. Secondary pumps 42 may be fluidly connected in secondary cooling fluid supply line 39, as shown, or elsewhere in the circuit as necessary, depending upon the location and type of secondary heat exchange means 32 employed.

As shown in FIG. 3, the substantial portion of secondary heat exchange system 37 may be located outside of containment walls 84. Therefore, it is desirable that potentially radioactive primary fluid 12 be prohibited from entering the secondary heat exchange system 37. A regulator means 85 is thus provided for maintaining an operating pressure of secondary cooling fluid 81 higher than the operating pressure of primary fluid 12. One embodiment of regulator means 85 is a backpressure valve 86, fluidly connected in secondary fluid return line 40 between primary heat exchange means 32 and secondary heat exchange means 43. Backpressure valve 86 may be set to maintain an upstream pressure greater than that of the primary heat exchange system 31 such that, if a leak occurs in primary heat exchanger 41, secondary fluid 81 will flow into primary heat exchange system 31, maintaining primary fluid 12 within the reactor building 23. Backpressure valve 86 may be of the type manufactured by the Ames Company, Model A820. Regulator means 85 may also include a system shutdown feature such as differential pressure transmitter 89 which will shut down and isolate both the primary and secondary heat exchange systems if the pressure in secondary heat exchange system 37 is not greater than the pressure in primary heat exchange system 31.

Operation of the system 30 may be observed in FIGS. 1 and 3. Primary fluid circulation is shown by flow arrows 87, and secondary cooling fluid circulation is shown by flow arrows 88. Initially, top 5 of reactor vessel is removed and the level of primary fluid 12 is raised from operating level 13 to refueling level 20, at least partially filling reactor cavity 6 and/or SFP 7 with primary fluid 12. The temporary cooling system 30, which has been temporarily positioned in the facility 1 on skids 55, is then operated as a partial or full off-load of fuel bundles 4 takes place. Primary fluid 12 is circulated within primary heat exchange system 31, transferring heat from primary fluid 12 at a faster rate than that attainable by the SFP cooling system 22. Secondary cooling fluid 81 is circulated in secondary heat exchange system 37, removing the transferred heat from the secondary cooling fluid 81. During the cooling of primary fluid 12, particulate matter is filtered by particulate filters 69, and demineralization is accomplished by demineralization means 70. Circulation is maintained in order to maintain a desired temperature of primary fluid 12 during the outage.

In a test application, primary fluid 12 was circulated at approximately 3,000 gallons per minute in primary heat exchange system 31, with primary heat exchangers 41 maintaining primary fluid 12 at a safe temperature during a full core off-load. The operation of the temporary cooling system 30 eliminated seventeen days of pre-cooling by the RHR system 15, saving millions of dollars in replacement power costs without the expense or complication of additional permanently installed equipment. Other embodiments of the invention will occur to those skilled in the art, and are intended to be included within the scope and spirit of the following claims.

We claim:

1. In combination with a nuclear power generating facility including:
    a composite fuel pool including a reactor cavity and a spent fuel pool fluidly connectable to said reactor cavity, said composite fuel pool at least partially containing a primary fluid;
    a nuclear reactor vessel positioned in said reactor cavity;
    a residual heat removal system installed in said facility and fluidly connectable to said reactor vessel; and
    a spent fuel pool cooling system installed in said facility and fluidly connectable to said spent fuel pool;
a temporary cooling system, comprising a primary heat exchange system, said primary heat exchange system being adapted to cool said primary fluid at a faster rate than said spent fuel pool cooling system, said primary heat exchange system including:
    a primary heat exchange means for transferring heat from a primary fluid to a secondary cooling fluid, said primary heat exchange means being temporarily positioned in said facility and having a primary inlet and a primary outlet, and a secondary inlet and a secondary outlet, said secondary inlet being fluidly connectable to a secondary cooling fluid supply line and said secondary outlet being fluidly connectable to a secondary cooling fluid return line;
    a primary pump being temporarily positioned in said facility and having an inlet and an outlet;
    a primary pump suction line having an inlet end and an outlet end, said inlet end removably and fluidly connected to said composite fuel pool and said outlet end fluidly connected to said inlet of said primary pump;
    a primary pump discharge line having an inlet end and an outlet end, said inlet end fluidly connected to said outlet of said primary pump and said outlet end fluidly connected to said primary inlet of said primary heat exchange means; and
    a primary return line having an inlet end and an outlet end, said inlet end fluidly connected to said primary outlet of said primary heat exchange means and said outlet end removably and fluidly connected to said composite fuel pool.

2. A temporary cooling system according to claim 1, further comprising a secondary heat exchange system, including:
    a secondary heat exchange means for cooling said secondary cooling fluid, said secondary heat exchange means having a secondary cooling fluid inlet and a secondary cooling fluid outlet, said secondary cooling fluid inlet being fluidly connected to a secondary cooling fluid return line, and said secondary cooling fluid outlet being fluidly connected to a secondary cooling fluid supply line;
    a secondary cooling fluid return line having an inlet end and an outlet end, said inlet end being fluidly connected to said secondary outlet of said primary heat exchange means, and said outlet end being fluidly connected to said secondary cooling fluid inlet of said secondary heat exchange means; and
    a secondary cooling fluid supply line having an inlet end and an outlet end, said inlet end being fluidly connected to said secondary cooling fluid outlet of said secondary heat exchange means, and said outlet end being fluidly connected to said secondary inlet of said primary heat exchange means.

3. A temporary cooling system according to claim 2, wherein said secondary heat exchange system further comprises a regulator means, connected to said secondary heat exchange system, for maintaining an operating pressure of said secondary cooling fluid higher than an operating pressure of said primary fluid.

4. A temporary cooling system according to claim 3, wherein said regulator means includes a backpressure valve, fluidly connected in said secondary cooling fluid return line between said primary heat exchange means and said secondary heat exchange means.

5. A temporary cooling system according to claim 1, wherein said primary heat exchange system further includes a particulate filter, fluidly connected in said temporary cooling system between said composite fuel pool and said primary heat exchange means.

6. A temporary cooling system according to claim 1, wherein said primary heat exchange system further includes a demineralization means for removing minerals from said primary fluid, fluidly connected in said temporary cooling system between said composite fuel pool and said primary heat exchange means.

7. A temporary cooling system according to claim 5, wherein said primary heat exchange system further includes a demineralization means for removing minerals from said primary fluid, fluidly connected in said temporary cooling system between said particulate filter and said primary heat exchange means.

8. A temporary cooling system according to claim 1, wherein said primary heat exchange system further comprises a regulator means, fluidly connected to said secondary cooling fluid outlet, for maintaining an operating pressure of said secondary cooling fluid higher than an operating pressure of said primary fluid.

9. A temporary cooling system according to claim 2, wherein said primary heat exchange system further includes a particulate filter, fluidly connected in said temporary cooling system between said composite fuel pool and said primary heat exchange means.

10. A temporary cooling system according to claim 3, wherein said primary heat exchange system further includes a particulate filter, fluidly connected in said temporary cooling system between said composite fuel pool and said primary heat exchange means.

11. A temporary cooling system according to claim 3, wherein said primary heat exchange system further includes a demineralization means for removing minerals from said primary fluid, fluidly connected in said temporary cooling system between said composite fuel pool and said primary heat exchange means.

12. A temporary cooling system according to claim 3, wherein said primary heat exchange system further includes a demineralization means for removing minerals from said primary fluid, fluidly connected in said temporary cooling system between said composite fuel pool and said primary heat exchange means.

13. A temporary cooling system according to claim 9, wherein said primary heat exchange system further includes a demineralization means for removing minerals from said primary fluid, fluidly connected in said temporary cooling system between said particulate filter and said primary heat exchange means.

14. A temporary cooling system according to claim 10, wherein said primary heat exchange system further includes a demineralization means for removing minerals from said primary fluid, fluidly connected in said temporary cooling system between said particulate filter and said primary heat exchange means.

15. A temporary cooling system according to claim 1, wherein said primary heat exchange means includes a plate-type heat exchanger.

16. A temporary cooling system according to claim 2, wherein said secondary heat exchange means includes a cooling tower.

17. In a nuclear power generating facility including:
a composite fuel pool including a reactor cavity and a spent fuel pool fluidly connectable to said reactor cavity;
a nuclear reactor vessel positioned in said reactor cavity, said nuclear reactor vessel containing a primary fluid at an operating level;
a residual heat removal system installed in said facility and fluidly connectable to said reactor vessel; and
a spent fuel cooling system installed in said facility and fluidly connectable to said spent fuel pool;
a method for cooling said primary fluid in said composite fuel pool, comprising the steps of:
temporarily and fluidly connecting a primary heat exchange system to said composite fuel pool, said primary heat exchange system being adapted to cool said primary fluid at a faster rate than said spent fuel pool cooling system;
raising said primary fluid from said operating level to a refueling level, at least partially filling said composite fuel pool with said primary fluid;
circulating said primary fluid in said primary heat exchange system in order to reach and maintain a desired temperature of said primary fluid; and
removing said primary heat exchange system from said facility.

18. A method for cooling according to claim 17, further comprising the step of filtering particulate matter from said primary fluid during said step of circulating said primary fluid.

19. A method for cooling according to claim 17, further comprising the step of demineralizing said primary fluid during said step of circulating said primary fluid.

20. A method for cooling according to claim 18, further comprising the step of demineralizing said primary fluid during said step of circulating said primary fluid.

21. A temporary cooling system according to claim 1, further comprising a flow distribution means, connected to a portion of said primary return line which is submersible in said composite fuel pool, for distributing return flow of said primary fluid into said composite fuel pool.

22. A temporary cooling system according to claim 21, wherein said flow distribution means comprises a plurality of flow distribution holes provided in said primary return line, positioned so as to evenly distribute flow of said primary fluid so as to minimize turbulence within said composite fuel pool.

23. A temporary cooling system according to claim 1, further comprising an antisiphon means, connected to a portion of said primary pump suction line which is submersible in said composite fuel pool, for preventing siphoning of said primary fluid out of said composite fuel pool when said primary fluid in said composite fuel pool falls below an undesirable level.

24. A temporary cooling system according to claim 23, wherein said anti-siphon means comprises at least one anti-siphon hole provided in said primary pump suction line, positioned at said undesirable level within said composite fuel pool.

* * * * *